United States Patent
Hashizume et al.

(10) Patent No.: US 6,602,339 B2
(45) Date of Patent: Aug. 5, 2003

(54) ALUMINUM PIGMENT, PROCESS FOR ITS PRODUCTION AND RESIN COMPOSITIONS CONTAINING THE SAME

(75) Inventors: Yoshiki Hashizume, Osaka (JP); Takayuki Nakao, Osaka (JP)

(73) Assignee: Toyo Aluminium Kabushiki Kaisha, Osaka (JP)

(*) Notice: Subject to any disclaimer, the term of this patent is extended or adjusted under 35 U.S.C. 154(b) by 0 days.

(21) Appl. No.: 10/149,766

(22) PCT Filed: Oct. 12, 2001

(86) PCT No.: PCT/JP01/08986
§ 371 (c)(1),
(2), (4) Date: Jun. 13, 2002

(87) PCT Pub. No.: WO02/31061
PCT Pub. Date: Apr. 18, 2002

(65) Prior Publication Data
US 2003/0066457 A1 Apr. 10, 2003

(30) Foreign Application Priority Data
Oct. 13, 2000 (JP) .......................... 2000-313505

(51) Int. Cl.$^7$ .............. C09C 1/64; C09C 3/06; C08K 9/02; C09D 7/12; C09D 201/00
(52) U.S. Cl. .......... 106/404; 106/479; 106/499; 106/503
(58) Field of Search ................. 106/404, 479, 106/499, 503

(56) References Cited

U.S. PATENT DOCUMENTS 5,296,032 A * 3/1994 Jenkins et al. .............. 106/404
5,480,481 A * 1/1996 Setoguchi et al. .......... 106/404
5,494,512 A * 2/1996 Yamamoto et al. ......... 106/404
5,540,768 A * 7/1996 Yamamoto et al. ......... 106/404

FOREIGN PATENT DOCUMENTS

| EP | 633297 A1 | 1/1995 |
| EP | 653465 A1 | 5/1995 |
| JP | 50-44133 A | 4/1975 |
| JP | 4-318181 A | 4/1991 |
| JP | 6-57171 A | 8/1992 |
| JP | 7-70468 A | 3/1995 |
| JP | 7-133440 A | 5/1995 |
| JP | 9-328629 A | 12/1997 |

OTHER PUBLICATIONS

Hinokuma et al. "Electrochromism of spin–coated MoO$_3$ $n$H$_2$O thin films from peroxo–polymolybdate", Solid State Ionics 53–56 (1992) pp. 507–512. (no month).

* cited by examiner

Primary Examiner—Anthony J. Green
(74) Attorney, Agent, or Firm—Nixon & Vanderhye P.C.

(57) ABSTRACT

An aluminum pigment excellent in water resistance useful in water-based metallic paints, water-based metallic inks and the like, is provided. The pigment is excellent in water resistance and has a coating derived from peroxo-polymolibdate represented by the compositional formula:

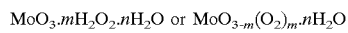

$$MoO_3 \cdot mH_2O_2 \cdot nH_2O \text{ or } MoO_{3-m}(O_2)_m \cdot nH_2O$$

where Mo is molybdenum, O is oxygen, $0 \leq m \leq 1$ and $1 \leq n \leq 2$ and also includes at least one amine selected from alkylamine, allylamine, arylamine, alkanolamine or alkoxylamine.

10 Claims, No Drawings

ALUMINUM PIGMENT, PROCESS FOR ITS PRODUCTION AND RESIN COMPOSITIONS CONTAINING THE SAME

TECHNICAL FIELD

The present invention relates to aluminum pigments useful in water metallic paints, water metallic inks or the like, method for their preparation and resin compositions containing them.

PRIOR ARTS

The incorporation of aluminum pigments into aqueous varnishes causes various problems such as an explosion of a container during storage due to the reaction with water contained in the varnishes to produce hydrogen gas and an agglomeration of the aluminum pigment to form grainings. Many techniques for resolving the problems have been developed. Among them, JP-B-89/054386 (1989), JP-A-59/074201 (1984), JP-B-85/008057 (1985), JP-A-04/318181 (1992), U.S. Pat. No. 5,296,032, JP-A-06/057171 (1994) and JP-A-09/328629 (1997) are known as recent techniques having high possibility of practical use.

JP-B-89/054386 (1989) discloses a method comprising treating an aluminum pigment with chromic acid. Although chemical stability of the aluminum pigment is improved according to the method, the method has problems such that the aluminum pigment in the finely divided form cannot be treated due to a strong reactivity of the treating liquid used and that the hygiene for operators and environment are damaged by using hexavalent chromium. Thus, the above method is not almost subjected to the practical use.

JP-A-59/074201 (1984) discloses a method comprising treating an aluminum pigment with ammonium vanadate. Color tone of the aluminum pigment is significantly changed by this treatment. Thus, the above method has not been practically applied.

JP-B-85/008057 (1985) discloses a method comprising coating an aluminum pigment with an acid phosphate ester. Although color tone and chemical stability of the aluminum pigment are better, the treating agent adversely affects an adhesion between the aluminum pigment and a resin when a film is formed according to the two-coat/one-bake coating method or the two-coat/two-bake coating method so that a base metallic film and a top coat will be delaminated, which becomes problematic.

JP-A-04/318181 (1992) discloses a method comprising treating an aluminum pigment with a treating liquid containing an oxidizing agent such as molybdic acid, a phosphate ion and an alkaline earth metal ion. Although the resultant aluminum pigment has excellent chemical stability, the phosphate ion and the alkaline earth metal ion contained in the treating liquid tend to lower physical properties including a moisture resistance of a film.

U.S. Pat. No. 5,296,032 discloses a method comprising treating an aluminum pigment with a heteropolyanion such as phosphomolybdic acid and the like. Although the aluminum pigment treated with phosphomolybdic acid is chemically stable, the phosphate ion contained in the treating liquid lowers physical properties including a moisture resistance of a film. Sufficient chemical stability is not obtained when any other treating agent is used.

JP-A-06/057171 (1994) discloses a method for stabilizing an aluminum pigment comprising treating the aluminum pigment with ammonium molybdate and then adding molybdate salt or the like. Although the resultant aluminum pigment has excellent chemical stability and the resultant film has better physical properties, the preparation process is complicated.

JP-A-09/328629 (1997) discloses an aluminum pigment treated with peroxo-polyanion. Since a coating derived from peroxo-polyanion is dense and has excellent corrosion resistance, an aluminum pigment which is chemically very stable to a varnish for water paints and water inks can be obtained by forming the coating on a surface of the aluminum pigment. In addition, since a component adversely affecting physical properties of a film such as a phosphate ion and an alkaline earth metal ion is not contained in the coating, moisture- and weather-resistances of the resultant film are not lowered even by incorporating the aluminum pigment having the above coating. Thus, the aluminum pigment is excellent chemical stability together with better physical properties of a film, but it has problems such that the aluminum pigment tends to be agglomerated during its preparation so that grainings are produced on the resultant film or it adversely affects an appearance of the resultant film. Thus, the above aluminum pigment is not practically applied.

SUMMARY OF THE INVENTION

The present inventors investigated to form a better coating derived from peroxo-polyanion on a surface of an aluminum pigment without agglomelating the aluminum pigment during its preparation. As the result, they found that it is effective to add at least one amine selected from alkylamine, allylamine, arylamine, alkanolamine and alkoxylamine to peroxo-polymolibdate and the chemical stability of the resultant coating and the prevention of an aluminum pigment from agglomerating can be improved by forming an adsorption layer of an organic phosphorus compound onto the coating.

DETAILED EXPLANATION OF THE INVENTION

According to the present invention made based on these findings, the aluminum pigment excellent in water resistance comprises at least one amine selected from alkylamine, allylamine, arylamine, alkanolamine and alkoxylamine and has a coating derived from polymolybdic acid peroxide formed on a surface thereof.

Preferably, 0.025 to 5 parts by weight of molybdenum (Mo) and 0.08 to 20 parts by weight of oxygen (O) are contained per 100 parts by weight of aluminum.

It is preferable to further have an adsorption layer of an organic phosphorus compound which is preferably an acidic phosphate ester derived from an aliphatic monohydric or polyhydric alcohol containing 4 to 18 carbon atoms, on the inorganic coating.

The aluminum pigment of the present invention is prepared by adding to an aluminum pigment composition containing an organic solvent, at least one amine selected from alkylamine, allylamine, arylamine, alkanolamine and alkoxylamine together with a solution of a metallic molybdenum dissolved in an aqueous hydrogen oxide and a hydrophilic solvent and then stirring and mixing to form an inorganic coating on a surface of the aluminum and if necessary, adding an organic phosphorus compound before getting paste.

Further, the resin composition according to the present invention is obtained by adding the aluminum pigment of the present invention.

Several essential features of the present invention and the reason for the numerical limitation of each essential feature are fully described below.

(1) Peroxo-polymolybdate

The peroxo-polymolybdate used in the present invention is represented by the compositional formula:

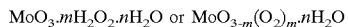

$$MoO_3 \cdot mH_2O_2 \cdot nH_2O \text{ or } MoO_{3-m}(O_2)_m \cdot nH_2O$$

wherein Mo is a molybdenum, O is oxygen, $0 \leq m \leq 1$ and $1 \leq is \leq 2$. A solution comprising polymolybdic acid peroxide having the above composition is prepared by the method comprising dissolving a metallic molybdenum in hydrogen oxide as described in, for example, Solid States Ionics, pp. 507–512, 1992. Owing to peroxo-polymolybdate having the above composition, a coating excellent in chemical stability can be formed on a surface of the aluminum pigment. And, such a pigment does not lower physical properties of the resultant film even if incorporated into a resin composition.

(2) Mo (Molybdenum) Content

The Mo content in the coating formed on the surface of the aluminum pigment is 0.02 to 5 parts by weight per 100 parts by weight of aluminum. If it is less than 0.02 part by weight, the desired chemical stability is hardly obtained. On the other hand, if it is above 5 parts by weight, the aluminum pigment agglomerates so that its design and its hiding property are impaired. Although JP-A-09/328629 (1997) describes that an amount of a metallic element is most suitably in the range from 0.01 to 2 parts by weight per 100 parts by weight of aluminum, the agglomeration of the aluminum pigment does not occur even if the amount of peroxo-polymolibdate is further increased, thereby a thicker coating with an improved chemical stability can be formed according to the present invention.

Preferably, the Mo content will be varied depending on a water covering area of the aluminum pigment. Specifically, it is preferable to satisfy the following equation within the above range.

$$0.2 \times S \leq Mo \leq 2 \times S$$

wherein Mo is the Mo content (parts by weight per 100 parts by weight of aluminum) and S is a water covering area of the aluminum pigment (m²/g).

(3) O (Oxygen) Content

The O content in the coating formed on the surface of the aluminum pigment is 0.08 to 20 parts by weight per 100 parts by weight of aluminum. If it is less than 0.08 part by weight, the desired chemical stability is hardly obtained. On the other hand, if it is above 20 parts by weight, the aluminum pigment agglomerates so that its design and its hiding property are impaired.

(4) Alkylamine, Allylamine, Arylamine, Alkanolamine and Alkoxylamine

When the aluminum pigment is treated merely with peroxo-polymolibdate, both are reacted vigorously so that the aluminum pigment is agglomerated. Thus, at least one amine is added to control the reaction between the aluminum pigment and peroxo-polymolibdate and to prevent the aluminum pigment from agglomerating. Since the amine forms a salt with polymolybdic acid peroxide, a passive coating can be obtained.

Example of the amine to be added includes methylamine, ethylamine, propylamine, isopropylamine, butylamine, amylamine, hexylamine, heptylamine, octylamine, nonylamine, decylamine, undecylamine, dodecylamine, tridecylamine, tetradecylamine, pentadecylamine, cetylamine, dimethylamine, diethylamine, dipropylamine, diisopropylamine, dibutylamine, diamylamine, trimethylamine, triethylamine, tripropylamine, tributylamine, triamylamine, allylamine, diallylamine, triallylamine, cyclopropylamine, cyclobutylamine, cyclopentylamine, cyclohexylamine, aniline, methylaniline, dimethylaniline, ethylaniline, diethylaniline, o-toluidine, m-toluidine, p-toluidine, benzylamine, dibenzylamine, tribenzylamine, diphenylamine, triphenylamine, α-naphtylamine, β-naphthylamine, 3,3'-iminobis (propylamine), 2-ethylhexylamine, 3-(2-ethylhexyloxy) propylamine, 3-ethoxypropylamine, 3-(diethylamino) propylamine, di-2-ethyhexylamine, 3-(dibutylamino) propylamine, tetramethylethylenediamine, tri-n-octylamine, 3-(methylamino)propylamine, 3-(dimethylamino) propylamine, N-methyl-3,3'-imino-bis(propylamine), 3-methoxypropylamine, 2-dimethylaminoethanol, monoethanolamine, diethanolamine, triethanolamine, 2-amino-2-methyl-1-propanol, N,N-dimethyl-1,3-propanediamine and morpholine.

Among them, 2-dimethylaminoethanol, triethanolamine, 3-(2-ethylhexyloxy)propylamine, 3-ethoxypropylamine, dibutylamine and 2-ethylhexylamine are particularly preferable.

An added amount of the amine is 0.02 to 10 parts by weight, preferably 0.1 to 5 parts by weight, per 100 parts by weight of aluminum. If it is less than 0.02 part by weight, the agglomeration of the aluminum pigment occurs. On the other hand, if it is above 10 parts by weight, physical properties such as adhesion, weather resistance, moisture resistance, water resistance and the like are lowered.

Preferably, the added amount of the amine will be varied depending on the Mo content in the coating formed on the surface of the aluminum pigment. Specifically, it is preferable to satisfy the following equation within the above range.

$$1 \times Mo \leq A \leq 4 \times Mo$$

wherein A is the added amount of the amine (parts by weight per 100 parts by weight of aluminum) and Mo is the Mo content (parts by weight per 100 parts by weight of aluminum).

(5) Organic Phosphorus Compound

The organic phosphorus compound can enhance the chemical stability of the coating and the prevention of the aluminum pigment from agglomerating. Further, it can improve a dispersion of the aluminum pigment in a paint and a color tone of the aluminum pigment. Since the organic phosphorus compound scarcely contains a phosphate ion, it does not adversely affect physical properties of the film.

Example of the preferable organic phosphorus compound includes acidic phosphate esters, polyoxyethylene alkylphenol phosphoric acids, phosphate esters obtained by reacting epoxy compounds or acrylic compounds with phosphoric acid, and (meth)acrylic phosphate esters.

Particularly preferable compound is an acidic phosphate ester derived from an aliphatic monohydric or polyhydric alcohol containing 4 to 18 carbon atoms. Such an acidic phosphate ester is a mixture of a monoester of an orthophosphoric acid with an aliphatic alcohol represented by R—O—PO(OH)$_2$ and a diester of an orthophosphoric acid with an aliphatic alcohol represented by (R—O)$_2$—PO(OH). Specific example thereof includes stearyl acid phosphate, myristyl acid phosphate, palmityl acid phosphate, lauryl acid phosphate, polyoxyethylene alkylphenylether acid phosphate, n-dodecyl acid phosphate, 2-ethylhexyl acid phosphate, oleyl acid phosphate, hexyl acid phosphate, butyl acid phosphate, ethylene glycol acid phosphate, mono(2- acryloyloxyethyl) acid phosphate, mono(2-methacryloyloxyethyl) acid phosphate, 2-acryloyloxy ethyl acid phosphate, 2-methacryloyloxyethyl acid phosphate and (2-hydroxyethyl)methacrylate acid phosphate.

A polymer is included in the scope of the organic phosphorus compound.

Example of the preferable polymer is epoxy resins, acrylic resins, alkyd resins, polyester resins, bisphenol-type epoxy resins, novolak-type epoxy resins, polyester polyol resins, polyoxyalkylene polyol resins, phenol resins, rosin modified phenol resins, xylene resins, ketone resins, melamine resins, urea resins, polyamide resins, polyamide polyamine epichlorohydrin resins, polyurethane resins, polyvinyl acetate resins, vinyl ester resins, nitrocellulose resins, fluoro resins, alicyclic hydrocarbon resin and their copolymers, to which phosphate groups are introduced.

A method of introducing a phosphate group into the above resin includes a method comprising acting a phosphoric acid or an alkyl phosphate onto an epoxy or hydroxyl group in the resin; and a method comprising polymerizing a polymerizable monomer containing a phosphate group with a precursor monomer constituting the skeleton of the above resin.

The polymer has preferably an average molecular weight ranging from 400 to 10,000. If it has the molecular weight of less than 400, the improvement in adhesion of the resultant film cannot be expected. On the other hand, if it has the molecular weight above 10,000, it lowers the stability of the aluminum pigment for which the agglomeration of the aluminum pigment may occur. Specific example of the polymer includes:

an adduct of an alicyclic epoxy compound ("CEL 2081" (trade name) manufactured by Daicel Chemical Ind.) with a phosphorus compound, called as "2081PO", based on the ingredient represented by the following structure I:

(Structure I)

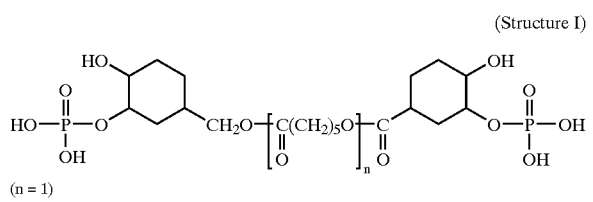

(n = 1)

and having an average molecular weight of about 1,100. Preferably, the alicyclic epoxy compound has a molecular weight ranging from about 300 to about 1,000, especially from about 700 to about 1,000 and an epoxy equivalent ranging from about 150 to about 500, especially from about 350 to about 500; and an adduct of an alicyclic epoxy compound (neopentyl glycol diglycidyl diether manufactured by Daicel Chemical Ind.) with a phosphorus compound, called as "NPG-PO", based on the ingredient represented by the following structure II:

from about 180 to about 400 and an epoxy equivalent ranging from about 100 to about 600, especially from about 120 to about 250.

Preferable added amount of the organic phosphorus compound is 0.1 to 10 parts by weight, more preferably 0.2 to 5 parts by weight, per 100 parts by weight of aluminum. If it is less than 0.1 part by weight, the desired effect is not obtained. On the other hand, if it is above 10 parts by weight, physical properties such as adhesion, weather resistance, moisture resistance and the like are adversely affected. Further, this amount will be varied depending on a water covering area of the aluminum pigment. Specifically, it is preferable to satisfy the following equation within the above range.

$$0.2 \times S \leq P \leq 2 \times S$$

wherein P is the added amount of the organic phosphorus compound (parts by weight per 100 parts by weight of aluminum) and S is a water covering area of the aluminum pigment ($m^2/g$).

(6) Method for Preparation

A method comprising adding to an aluminum pigment composition containing any organic solvent, at least one amine selected from alkylamine, allylamine, arylamine, alkanolamine and alkoxylamine together with a solution comprising peroxo-polymolibdate obtained by adding a metallic molybdenum dissolved in an aqueous hydrogen oxide and a hydrophilic solvent, stirring and mixing to form an inorganic coating on a surface of the aluminum and if necessary, adding an organic phosphorus compound before getting paste is preferable since the preparation process is simple, provided that methods for preparation of the aluminum pigment are not limited thereto. It is desirable to control the reaction by adjusting conditions such as temperature, pressure and humidity if necessary during stirring and mixing.

As the aluminum pigment composition containing any organic solvent, the conventional aluminum paste is preferably used. The aluminum paste as used herein means a pasty composition comprising a flaky aluminum to which any organic solvent such as mineral sprit is added in an amount of 10 to 100 parts by weight per 100 parts by weight of the aluminum and having an adsorption layer of a fatty acid such as oleic acid or stearic acid on a surface of the aluminum. Desirably, the fatty acid is previously removed as much as possible by washing or the like.

The method for adding the amine is not particularly limited. Generally, the amine is dissolved in an organic solvent such as mineral spirit, alcohol or the like before the addition.

The solution comprising peroxo-polymolibdate represented by the compositional formula:

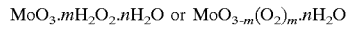

wherein Mo is molybdenum, O is oxygen, $0 \leq m \leq 1$ and $1 \leq n \leq 2$ is prepared by dissolving a metallic molybdenum in

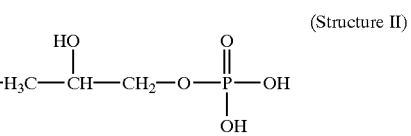

(Structure II)

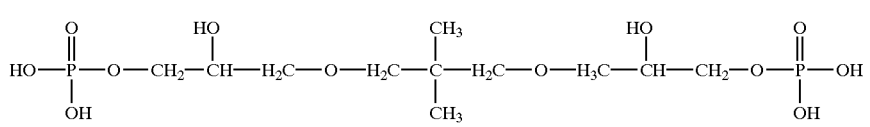

and having an average molecular weight of about 410. Preferably, the alicyclic epoxy compound has a molecular weight ranging from about 150 to about 1,000, especially an aqueous hydrogen peroxide containing hydrogen peroxide, as described above. Depending on the concentration of the aqueous hydrogen peroxide, the values of m and n as well as crystalline structure, color and solubility in water of polymolybdic acid peroxide will be changed. According to the experiment of the present inventors for finding the condition suitable for the formation of the inorganic coating which improves the water resistance of the aluminum pigment, the method comprising dissolving 1 to 50% by weight, preferably 5 to 20% by weight, of a metallic molybdenum or a molybdenum compound such as molybdenum oxide, molybdenum alkoxide and the like in an aqueous hydrogen oxide at the concentration of 1 to 70% by weight, preferably 5 to 50% by weight is suitable. If the aqueous hydrogen peroxide has a lower concentration, the metallic element is hardly dissolved. On the other hand, the use of the aqueous hydrogen peroxide having a higher concentration is dangerous since vigorous reaction occurs upon the addition of the metallic element. If the metallic element has a lower concentration, the desired effect is hardly obtained. On the other hand, if it has a higher concentration, it is not completely dissolved in the aqueous hydrogen peroxide. Desirably, the solution comprising polymolybdic acid peroxide is diluted in a hydrophilic solvent such as an alcohol or the like before its addition. Preferable example of the usable hydrophilic solvent includes methyl alcohol, ethyl alcohol, n-propyl alcohol, isopropyl alcohol, n-butyl alcohol, isobutyl alcohol, acetone, ethyl cellosolve, propylene glycol monomethyl ether, dipropylene glycol monomethyl ether and the like.

In order to improve a dispersibility of the aluminum pigment in a paint and an affinity thereof to a resin and/or to further improve a corrosion resistance of the aluminum pigment, any surfactant such as polyoxyethylene alkyl phenol ether, polyoxyethylene alkylamine, alkylbenzene sulfonate salt and the like and any other corrosion inhibitor such as a dimer acid and the like may be added to the surface of the aluminum pigment of the present invention.

The aluminum pigment of the present invention is used as a resin composition to be incorporated in paints, inks and the like. The resin composition as used herein includes paints and films made therefrom as well as inks and printed matters made thereby. The paint or the ink based on an organic solvent or water is usable, but the use of a water paint or a water ink is particularly suitable in the present invention in view of the purpose of the present invention. An amount of the aluminum pigment to be incorporated in the resin composition is suitably 0.1 to 30% by weight based on the total weight of the resin composition. If it is less than 0.1% by weight, sufficient decorative (metallic) effect is not obtained. On the other hand, if it is above 30% by weight, physical properties such as weather resistance, corrosion resistance, mechanical strength and the like of the resin composition are adversely affected.

Paints and inks consist of the following components:
1) resin: acrylic resins, alkyd resins, polyester resins, polyurethane resins, polyvinyl acetate resins, nitrocellulose resins, fluroresins;
2) pigment: in addition to the aluminum pigment of the present invention, color pigments, extender pigments and/or dyes such as phthalocyanine, quinacridone, isoindolinone, perylene, azo lake, iron oxide, chrome yellow, carbon black, titanium oxide, pearl mike and the like; and
3) additives: water, organic solvents, surfactants, curing agents, UV absorbers, static removers, thickeners and the like.

The resin composition of the present invention may be applied to an undercoat or an intermediate coat by any suitable method including the electrodeposition coating to form a film. The film may be coated with a top coat.

Action and Effect

The aluminum pigment of the present invention is chemically stable and therefore it can be suitably used in water paints and water inks. And, the agglomeration of the aluminum pigment which is the problem caused by treating with polyacid peroxide in the prior art can be resolved.

The method of preparing the aluminum pigment of the present invention is simple in steps and therefore the aluminum pigment of the present invention can be prepared with a low cost.

The resin composition of the present invention has excellent storage stability as water paints and water inks so that the production of a hydrogen gas during storage and the agglomeration of an aluminum pigment are not observed. The resultant film and printed matter is excellent in terms of physical properties including moisture resistance.

EXAMPLES

Example 1

Solvents were removed from the commercially available aluminum pigment (7640NS manufactured by Toyo Aluminium K.K.; non-volatile content=65%; water covering area=1.1 m$^2$/g) to prepare a cake having a non-volatile content of 80% (hereinafter referred to as "7640NS cake"). To 1 kg of this 7640NS cake, 20 g of 2-dimethylamino ethanol and a solution obtained by adding 8 g of a metallic molybdenum powder in small portions to 100 g of an aqueous hydrogen peroxide containing 30% hydrogen peroxide and reacting them to prepare a solution which was then dissolved in 175 g of isopropyl alcohol were added and kneaded at 60° C. for 1 hour. Then, 100 g of dipropylene glycol monomethyl ether and 10 g of oleyl acid phosphate were added and further mixed at an ordinary temperature for 30 minutes before getting a pasty aluminum pigment.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 0.95 part by weight of Mo and 3.6 parts by weight of O per 100 parts by weight of aluminum.

Example 2

To 1 kg of the 7640NS cake used in Example 1, 20 g of tert-butylamine and a solution obtained by adding 8 g of a metallic molybdenum powder in small portions to 100 g of an aqueous hydrogen peroxide containing 30% hydrogen peroxide and reacting them to prepare a solution which was then dissolved in 175 g of isopropyl alcohol were added and kneaded at 60° C. for 1 hour. Then, 100 g of dipropylene glycol monomethyl ether and 10 g of oleyl acid phosphate were added and further mixed at an ordinary temperature for 30 minutes before getting a pasty aluminum pigment.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 0.97 part by weight of Mo and 3.5 parts by weight of O per 100 parts by weight of aluminum.

Example 3

To 1 kg of the 7640NS cake used in Example 1, 20 g of 3-(2-ethylhexyloxy)propylamine and a solution obtained by adding 8 g of a metallic molybdenum powder in small portions to 100 g of an aqueous hydrogen peroxide containing 30% hydrogen peroxide and reacting them to prepare a solution which was then dissolved in 175 g of isopropyl alcohol were added and kneaded at 60° C. for 1 hour. Then, 100 g of dipropylene glycol monomethyl ether and 10 g of oleyl acid phosphate were added and further mixed at an ordinary temperature for 30 minutes before getting a pasty aluminum pigment.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 0.99 part by weight of Mo and 3.7 parts by weight of O per 100 parts by weight of aluminum.

Example 4

To 1 kg of the 7640NS cake used in Example 1, 4 g of triethanol amine and a solution obtained by adding 2 g of a metallic molybdenum powder in small portions to 100 g of an aqueous hydrogen peroxide containing 30% hydrogen peroxide and reacting them to prepare a solution which was then dissolved in 175 g of isopropyl alcohol were added and kneaded at 60° C. for 1 hour. Then, 100 g of dipropylene glycol monomethyl ether and 10 g of oleyl acid phosphate were added and further mixed at an ordinary temperature for 30 minutes before getting a pasty aluminum pigment.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 0.25 part by weight of Mo and 1.76 parts by weight of O per 100 parts by weight of aluminum.

Example 5

To 1 kg of the 7640NS cake used in Example 1, 20 g of 2-amino-2-methyl-1-propanol and a solution obtained by adding 8 g of a metallic molybdenum powder in small portions to 100 of an aqueous hydrogen peroxide containing 30% hydrogen peroxide and reacting them to prepare a solution which was then dissolved in 175 g of isopropyl alcohol were added and kneaded at 60° C. for 1 hour. Then, 100 g of propylene glycol monomethyl ether and 10 g of hexyl acid phosphate were added and further mixed at an ordinary temperature for 30 minutes before getting a pasty aluminum pigment.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 0.98 part by weight of Mo and 3.9 parts by weight of O per 100 parts by weight of aluminum.

Example 6

To 1 kg of the 7640NS cake used in Example 1, 40 g of n-butylamine and a solution obtained by adding of 32 g of a metallic molybdenum powder in small portions to 200 g of an aqueous hydrogen peroxide containing 30% hydrogen peroxide and reacting them to prepare a solution which was then dissolved in 175 g of isopropyl alcohol were added and kneaded at 60° C. for 1 hour. Then, 100 g of dipropylene glycol monomethyl ether and 10 g of butyl acid phosphate were added and further mixed at an ordinary temperature for 30 minutes before getting a pasty aluminum pigment.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 7.8 part by weight of Mo and 11.5 parts by weight of O per 100 parts by weight of aluminum.

Example 7

To 1 kg of the 7640NS cake used in Example 1, 20 g of morpholine and a solution obtained by adding 8 g of a metallic molybdenum powder in small portions to 100 g of an aqueous hydrogen peroxide containing 30% hydrogen peroxide and reacting them to prepare a solution which was then dissolved in 175 g of isopropyl alcohol were added and kneaded at 60° C. for 1 hour. Then, 100 g of dipropylene glycol monomethyl ether, 10 g of oleyl acid phosphate and 20 g of polyoxyethylene nonylphenol ether as a surfactant were added and further mixed at an ordinary temperature for 30 minutes before getting a pasty aluminum pigment.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 0.96 part by weight of Mo and 3.9 parts by weight of O per 100 parts by weight of aluminum.

Example 8

To 1 kg of the 7640NS cake used in Example 1, 20 g of 3-ethoxypropylamine and a solution obtained by adding 8 g of a metallic molybdenum powder in small portions to 100 g of an aqueous hydrogen peroxide containing 30% hydrogen peroxide and reacting them to prepare a solution which was then dissolved in 175 g of isopropyl alcohol were added and kneaded at 60° C. for 1 hour. Then, 100 g of dipropylene glycol monomethyl ether was added and further mixed at an ordinary temperature for 30 minutes before getting a pasty aluminum pigment.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 0.99 part by weight of Mo and 4.1 parts by weight of O per 100 parts by weight of aluminum.

Example 9

To 1 kg of the 7640NS cake used in Example 1, 20 g of 3-(2-ethylhexyloxy)propylamine and a solution obtained by adding 8 g of a metallic molybdenum powder in small portions to 100 g of an aqueous hydrogen peroxide containing 30% hydrogen peroxide and reacting them to prepare a solution which was then dissolved in 175 g of isopropyl alcohol were added and kneaded at 60° C. for 1 hour. Then, 100 g of dipropylene glycol monomethyl ether and 15 g of an adduct (2081-PO) of an alicyclic epoxy compound (CEL 2081 (trade name) manufactured by Daicel Chemical Ind.) with a phosphorus compound was added and further mixed at an ordinary temperature for 30 minutes before getting a pasty aluminum pigment.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 0.98 part by weight of Mo and 4.2 parts by weight of O per 100 parts by weight of aluminum.

Example 10

To 1 kg of the 7640NS cake used in Example 1, 20 g of 3-(2-ethylhexyloxy)propylamine and a solution obtained by adding 8 g of a metallic molybdenum powder in small portions to 100 g of an aqueous hydrogen peroxide containing 30% hydrogen peroxide and reacting them to prepare a solution which was then dissolved in 175 g of isopropyl alcohol were added and kneaded at 60° C. for 1 hour. Then, 100 g of dipropylene glycol monomethyl ether and 15 g of an adduct (NPG-PO) of an alicyclic epoxy compound (neopentylglycol diglycidyl diether manufactured by Daicel Chemical Ind.) with a phosphorus compound was added and further mixed at an ordinary temperature for 30 minutes before getting a pasty aluminum pigment.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 0.98 part by weight of Mo and 3.8 parts by weight of O per 100 parts by weight of aluminum.

Comparative Example 1

To 1 kg of the 7640NS cake used in Example 1, a solution obtained by adding 8 g of a metallic molybdenum powder in small portions to 100 g of an aqueous hydrogen peroxide containing 30% hydrogen peroxide and reacting them to prepare a solution which was then dissolved in 175 g of isopropyl alcohol was added and kneaded at 60° C. for 1 hour. Then, 100 g of dipropylene glycol monomethyl ether and 10 g of oleyl acid phosphate were added and further mixed at an ordinary temperature for 30 minutes before getting a pasty aluminum pigment.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 0.99 part by weight of Mo and 4.1 parts by weight of O per 100 parts by weight of aluminum.

Comparative Example 2

To 1 kg of the 7640NS cake used in Example 1, 20 g of tert-butylamine and a solution obtained by adding 8 g of a phosphomolybdic acid powder containing 8 g of Mo to 100 g of an aqueous hydrogen peroxide containing 30% hydrogen peroxide to prepare a solution which was then dissolved in 175 g of isopropyl alcohol was added and kneaded at 60° C. for 1 hour. Then, 100 g of dipropylene glycol monomethyl ether and 10 g of oleyl acid phosphate were added and further mixed at an ordinary temperature for 30 minutes before getting a pasty aluminum pigment.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 0.95 part by weight of Mo and 3.5 parts by weight of O per 100 parts by weight of aluminum.

Comparative Example 3

To a slurry comprising 500 g of the 7640NS cake used in Example 1 dispersed in 2,000 ml of propylene glycol monomethyl ether while stirring, a solution of ammonium paramolybdate containing 4 g of Mo dissolved in 400 ml of a deionized water was added slowly and reacted for 1 hour while keeping the slurry at 18° C. The resultant slurry was solid-liquid separated to obtain a pasty aluminum pigment with a solid content of 50%.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 0.89 part by weight of Mo and 3.1 parts by weight of O per 100 parts by weight of aluminum.

Comparative Example 4

To 1 kg of the 7640NS cake used in Example 1, a solution comprising 10 g of oleyl acid phosphate dissolved in 220 g of mineral spirit was added and kneaded for 30 minutes before getting a pasty aluminum pigment with a solid content of 65%.

The pasty aluminum pigment was washed with acetone, dried and powdered to prepare a sample. The Mo content in the sample was determined by inductively coupled plasma specrometer. The O content in the sample was also determined by the inert gas fusion method. The results shows that the sample contained 1.5 parts by weight of O per 100 parts by weight of aluminum. Mo was not detected.

Examples 11 to 20

Using each of the aluminum pigments obtained in Examples 1 to 10, a water metallic base paint having the following formulation was prepared.

| | |
|---|---|
| water soluble acrylic resin [1] | 28.2 g |
| melamine resin [2] | 4.4 g |
| triethanolamine | 1.1 g |
| deionized water | 44.8 g |
| isopropyl alcohol | 3.0 g |
| transparent iron oxide [3] | 5.0 g |
| aluminum pigment | 3.0 g |
| (Ex. 1 to 8) | (as solid content) |

[1] Alumatex WA 911 manufactured by Mitsui Toatsu Chemical
[2] Cymel 350 manufactured by Mitsui Toatsu Chemical Co.
[3] SICOTRANS RED L2175D manufactured by BASF

Comparative Examples 5 to 8

Using each of the aluminum pigments obtained in Comparative Examples 1 to 4, a water metallic base paint having the formulation identical with that of Examples 9 to 16 was prepared.

Test 1

80 Grams of the water metallic base paint made in each of Examples 11 to 20 as well as Comparative Examples 5 to 8 was sampled. This sample was stored in a water bath controlled at 50° C. for 7 days to determine a cumulative volume of hydrogen gas produced.

Test 2

To a steel plate for test previously electrodeposited with a primary anticorrosive paint, each of the water metallic base paint prepared in each of Examples 11 to 20 as well as Comparative Examples 5 to 8 was air sprayed such that the resultant film had a dry thickness of 13 μm and pre-dried at 90° C. for 10 minutes, to which an organic solvent base paint for top coat having the following composition was air sprayed such that the resultant film had a dry thickness of 40 μm, thereby a metallic coated panel was prepared.

|  |  |
|---|---|
| acrylic resin [1] | 140 g |
| melamine resin [2] | 50 g |
| Solvesso 100 | 60 g |

[1] Alumatex 110 manufactured by Mitsui Toastu Chemical Co.
[2] UVAN 20SE60 manufactured by Mitsui Toastu Chemical Co.

The coated panel immediately after the preparation and exposed to an atmosphere at 50° C. and 100% RH for 7 days were tested for the adhesion according to the method of ASTM D3359B and evaluated by 6-rank scoring. The rank of 4B or more in this test is desirable for practical use.

Test 3

10 Grams of the aluminum pigment composition prepared in each of Examples 1 to 10 as well as Comparative Examples 1 to 4 was dispersed in isopropyl alcohol and subjected to a wet screening method using a sieve of 45 μm sieve opening to determine a residue on the sieve.

The aluminum pigment composition was stored at 50° C. for 7 days to prepare a sample. 10 Grams of this sample was similarly tested to determine a residue on the screen.

Results of Tests 1 to 3 are shown in Table 1.

TABLE 1

| aluminum pigment used | Test 3 (residue on sieve: %) | |
|---|---|---|
| | immediately after preparation | after storage at 50° C. for 7 days |
| Ex.1 | 0.05 | 0.05 |
| Ex.2 | 0.05 | 0.06 |
| Ex.3 | 0.05 | 0.05 |
| Ex.4 | 0.05 | 0.05 |
| Ex.5 | 0.05 | 0.05 |
| Ex.6 | 0.12 | 0.14 |
| Ex.7 | 0.05 | 0.07 |
| Ex.8 | 0.08 | 0.11 |
| Ex.9 | 0.05 | 0.05 |
| Ex.10 | 0.06 | 0.08 |
| Comp.Ex.1 | 1.56 | 2.98 |
| Comp.Ex.2 | 0.22 | 1.53 |
| Comp.Ex.3 | 0.07 | 0.09 |
| Comp.Ex.4 | 0.05 | 0.05 |

| aluminum pigment used | Test 1 (gas volume: ml) | Test 2(adhesion) | |
|---|---|---|---|
| | | immediately after preparation | after storage at 50° C., 100% RH for 7 days |
| Ex.11 | 0 | 5B | 5B |
| Ex.12 | 0.1 | 5B | 5B |
| Ex.13 | 0 | 5B | 5B |
| Ex.14 | 0.5 | 5B | 5B |
| Ex.15 | 0.1 | 5B | 5B |
| Ex.16 | 0 | 5B | 4B |
| Ex.17 | 0.3 | 4B | 4B |
| Ex.18 | 1 | 5B | 5B |
| Ex.19 | 0.3 | 5B | 5B |

TABLE 1-continued

| Ex.20 | 0 | 4B | 4B |
|---|---|---|---|
| Comp.Ex.5 | 2.5 | 5B | 5B |
| Comp.Ex.6 | 3.8 | 4B | 3B |
| Comp.Ex.7 | 2.8 | 5B | 4B |
| Comp.Ex.8 | 7.3 | 3B | 3B |

What is claimed is:

1. An aluminum pigment excellent in water resistance having a coating derived from peroxo-polymolybdate represented by the compositional formula:

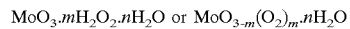

$$MoO_3 \cdot mH_2O_2 \cdot nH_2O \text{ or } MoO_{3-m}(O_2)_m \cdot nH_2O$$

wherein Mo is molybdenum, O is oxygen $0 \leq m \leq 1$ and $1 \leq n \leq 2$ and comprising at least one amine selected from the group consisting of alkylamine, allylamine, arylamine, alkanolamine and alkoxylamine.

2. An aluminum pigment excellent in water resistance according to claim 1 wherein the coating formed contains 0.02 to 5 parts by weight of Mo and 0.08 to 20 parts by weight of O per 100 parts by weight of aluminum.

3. An aluminum pigment excellent in water resistance according to claim 1 wherein the total amount of the at least one amine selected from the group consisting of alkylamine, allylamine, arylamine, alkanolamine and alkoxylamine is 0.02 to 10 parts by weight per 100 parts by weight of aluminum.

4. An aluminum pigment excellent in water resistance according to claim 1 wherein an adsorption layer of an organic phosphorus compound is further formed on the coating.

5. An aluminum pigment excellent in water resistance according to claim 4 wherein the organic phosphorus compound is an acid phosphate ester derived from an aliphatic monohydric or polyhydric alcohol containing 4 to 18 carbon atoms.

6. An aluminum pigment excellent in water resistance according to claim 4 wherein the organic phosphorus compound is a polymer having an average molecular weight ranging from 400 to 10,000.

7. An aluminum pigment excellent in water resistance according to claim 4 wherein an added amount of the organic phosphorus compound is 0.2 to 5 parts by weight per 100 parts by weight of aluminum.

8. A method for preparing an aluminum pigment according to claim 1 comprising adding at least one amine selected from the group consisting of alkylamine, allylamine, arylamine, alkanolamine and alkoxylamine together with a solution of a metallic molybdenum or molybdenum compound dissolved in an aqueous hydrogen peroxide and a hydrophilic solvent to an aluminum pigment composition containing an organic solvent, stirring and mixing them to form an inorganic coating on a surface of the aluminum pigment.

9. The method of claim 8 wherein an organic phosphorus compound is added to the aluminum pigment composition.

10. A resin composition comprising an aluminum pigment according to claim 1.

* * * * *